May 31, 1927.
J. R. BARNHART
1,630,884
ELECTRICAL INDICATING INSTRUMENT
Filed March 8, 1922
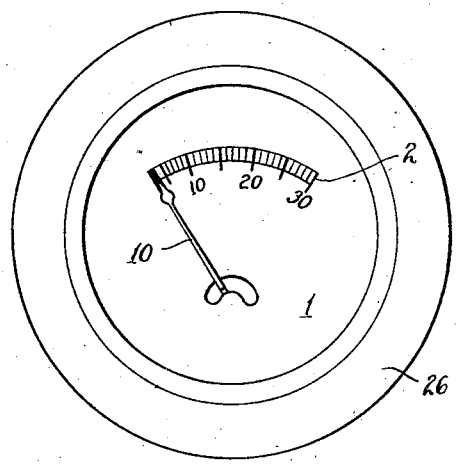
Fig-1
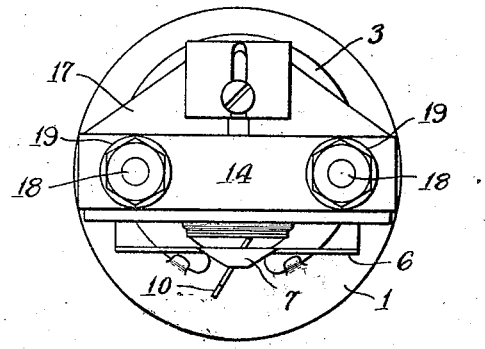
Fig-2
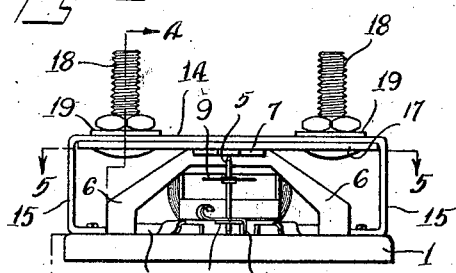
Fig-3
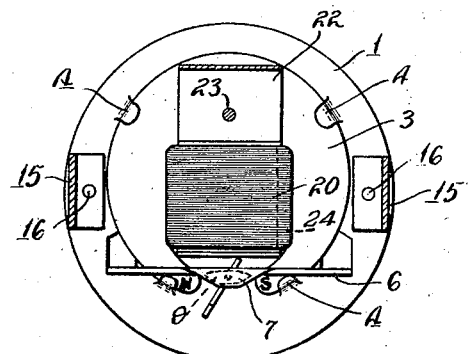
Fig-5
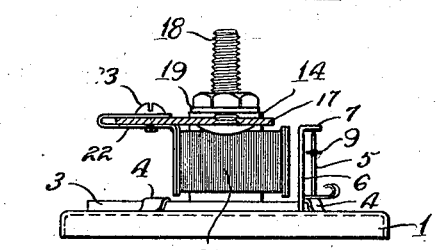
Fig-6  Fig-4
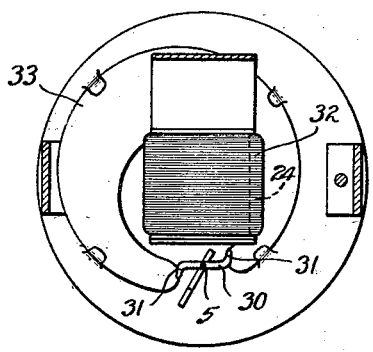
Fig-7
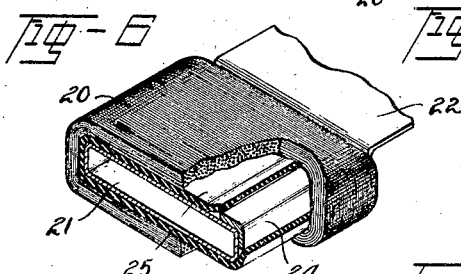
Inventor
Job R. Barnhart,
By Stull, Buck & West.
Attys Patented May 31, 1927.

1,630,884

UNITED STATES PATENT OFFICE.

JOB R. BARNHART, OF LAKEWOOD, OHIO, ASSIGNOR TO WALTER M. SCOTT, OF LAKEWOOD, OHIO.

ELECTRICAL INDICATING INSTRUMENT.

Application filed March 8, 1922. Serial No. 542,176.

This invention relates to electrical indicating instruments and has particular reference to alternating current voltmeters and ammeters The primary object of the invention is to provide an alternating current voltmeter or ammeter which shall be simple and rugged in construction, inexpensive of production, and highly efficient in operation.

Another object of the invention is to provide an instrument of this character which shall be of the same general construction as a direct current voltmeter or ammeter but which shall be capable of deflecting the indicator in the same direction each time an alternating current is applied thereto.

A still further object is to provide an instrument of this character which shall be so constructed and arranged as to have a substantially uniform scale and which shall be accurate over a wide range of voltages or amperages.

With these and other objects in view, the invention resides in the various novel features of construction and arrangement or combination of parts, all of which will be fully described hereinafter and pointed out in the appended claims.

In the accompanying drawings, Fig. 1 is a front elevation of an alternating current voltmeter or ammeter constructed in accordance with my invention; Fig. 2 is a rear elevation, and Fig. 3 a side elevation respectively, with the housing removed; Figs. 4 and 5 are sectional views taken respectively on the line 4—4 and 5—5 of Fig. 3; Fig. 6 is a detail perspective view of the solenoid, with parts broken away; and Fig. 7 a sectional view of a modified form of voltmeter or ammeter.

Describing by reference characters the various parts illustrated, 1 denotes a suitable base which is provided on one side with a scale 2 and on the opposite side with a permanent magnet 3 which is conveniently secured thereto by clips 4 struck up from said base. A needle staff 5 is arranged between the poles of magnet 3 and is pivotally supported between the base and an upper supporting member 7 which projects laterally from a pair of legs 6. The staff 5 has mounted thereon an armature 9, an indicating needle 10, and a damping device 11, said damping device being located in or adjacent to a point of high concentration of the permanent magnet field which tends to resist rapid and vibratory movement of the indicating needle, and the armature 9 being spaced from said damping device and located in or adjacent to the field of a solenoid, to be referred to hereinafter.

A bridge 14 having downwardly and inwardly projecting lugs 15 is secured to the base in any suitable manner, as by means of screws 16. This bridge is provided on its underside with an apron 17 of insulating material, and is clamped to the bridge by binding posts 18, 18. These binding posts extend through enlarged apertures in the bridge and are insulated from the bridge by said apron and by suitable insulating washers 19.

20 denotes a solenoid, which is wound on a hollow sheet metal form 21, preferably of non-magnetic material, such as brass. This form is rectangular in cross section and one end thereof is projected beyond the winding 20, as indicated at 22, and bent upon itself about the insulating apron 17 to which it is adjustably fastened by a screw 23. In practice a sheet of soft iron 24 is positioned along one of the lateral edges of the winding form, as shown in Fig. 6, then a sheet of insulating material 25 is placed about the winding form and sheet iron, so that the solenoid winding will be insulated from the metal parts. The ends of the solenoid winding are connected to their respective binding posts 18, 18.

The base 1 and associated parts are assembled in a suitable cup-shaped casing 26 to protect the meter and facilitate the handling thereof.

In operation, the permanent magnet field will exert a force on the armature 9 which will tend to normally retain the indicating needle 10 at zero position. When an alternating current is applied to the terminals 18, 18, the solenoid will be energized and a magnetic field created thereabout. The magnetic lines of force of this field will pass through the soft iron 24 and hence cause a higher concentration of these lines of force on one side of the solenoid than elsewhere. This concentrated magnetic field will always exert a stronger initial pull on the corresponding side of the armature 9 and hence cause the armature and the staff and the elements associated therewith to be rotated in the same predetermined direction each time the solenoid is energized, irrespective of the reversible polarization of the solenoid established by the alternation of the current. It will be noted in this connection that the position of the soft iron 24 with respect to the armature 9 as shown in Fig. 5 is such that the influence exerted by it on the armature is greatest when the armature stands approximately in its original position or just before it begins to respond to the magnetic attraction and rapidly decreases as the end of the armature is drawn within or toward the solenoid, thus making possible a substantially uniform scale calibration for the indicating needle.

In Fig. 7 I have shown a modified form of construction for imparting a predetermined initial direction of rotation to the armature and indicating needle when the solenoid is energized by an alternating current. In this form, an armature 30 is provided with oppositely projecting ends 31 one of these ends projecting toward the solenoid 32 and the opposite end projecting in an opposite direction therefrom. The permanent magnet 33 is so arranged that the influence of its magnetic field on the armature 30 will tend to retain the needle at zero position. When the solenoid 32 is energized by an alternating current, the needle staff will always be deflected in a counter-clockwise direction, as viewed in Fig. 7, since one end of the armature 30 is nearer the magnetic field of the solenoid than the other end, and hence a rotational movement in a predetermined direction will be imparted to the needle staff, irrespective of the direction of the current flowing through the solenoid. The remaining elements of the meter are similar to those previously described in connection with Figs. 1–6 inclusive.

Having thus described my invention, what I claim is:

1. In an alternating current voltmeter or ammeter, the combination, with a solenoid, of a movable system mounted in operative relation to said solenoid, an armature carried by said movable system and arranged nearer one pole of said solenoid than the other, said armature being adapted to be attracted by said solenoid, and means positioned along one side of said solenoid for causing a higher concentration of the magnetic field on one side of said solenoid than on the other side.

2. In an alternating current voltmeter or ammeter, the combination, with a solenoid, of a movable system mounted in operative relation to said solenoid, an armature carried by said movable system and arranged nearer one pole of said solenoid than the other, said armature being adapted to be attracted by said solenoid, and means for causing a higher concentration of the magnetic field on one side of said solenoid than on the other side.

3. In an alternating current voltmeter or ammeter, the combination, with a solenoid, of a movable system mounted in operative relation to said solenoid, an armature carried by said movable system and arranged nearer one pole of said solenoid than the other, said armature being adapted to be attracted by said solenoid, and a soft iron core positioned along one of the lateral edges of said solenoid adapted to increase the pull of such side on said armature over the pull exerted on the other side thereof.

4. In an alternating current voltmeter or ammeter, the combination, with a base of a permanent magnet carried by said base, a movable system mounted in operative relation to said magnet, a damping device carried by said movable system and disposed in the field of said permanent magnet, an armature carried by said movable system, a solenoid having one pole thereof disposed in operative relation to said armature, and means for causing the solenoid always to exert a stronger pull upon a predetermined side of said armature than upon the other side thereof.

5. In an alternating current voltmeter or ammeter, the combination, with a solenoid, of a movable system mounted outside of and adjacent to one pole of said solenoid, an armature carried by said movable system adapted to be attracted by said solenoid, a soft iron element arranged on one side of said solenoid for increasing the pull of such side upon said armature over the pull exerted by the other side thereof and a damping device carried by said movable system.

In testimony whereof, I hereunto affix my signature.

JOB R. BARNHART.